A. W. McKOWN.
AUXILIARY WAGON-SPRING.
No. 192,383. Patented June 26, 1877.
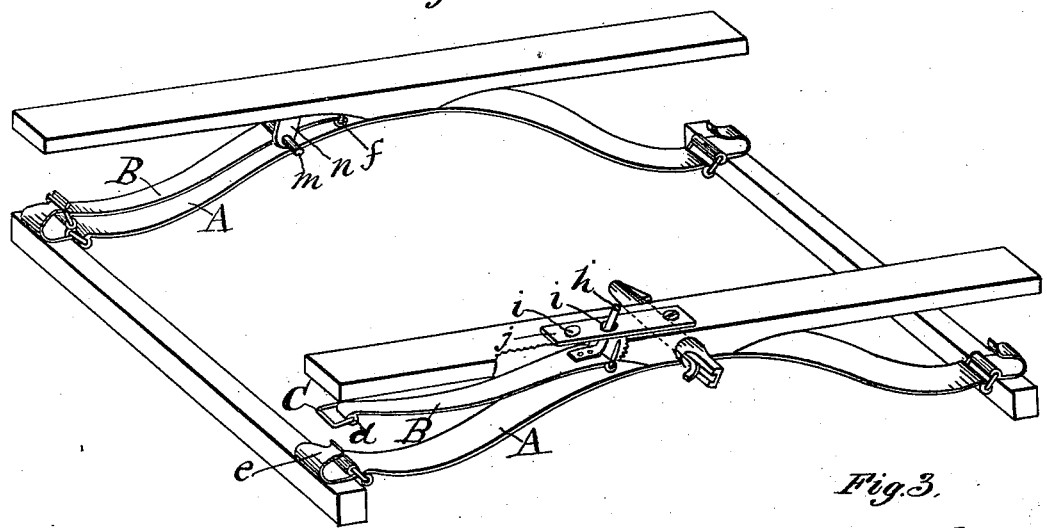
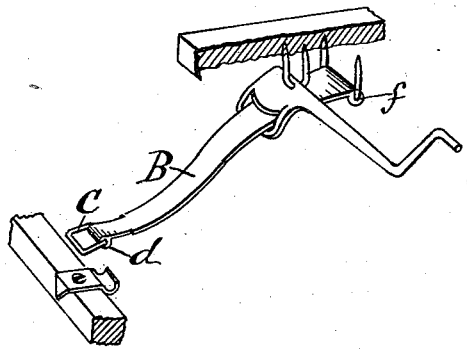
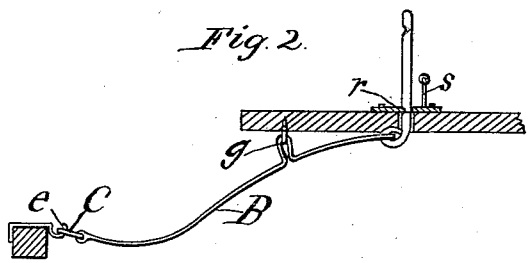
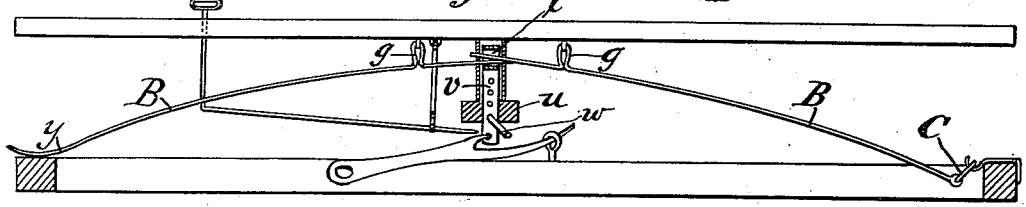
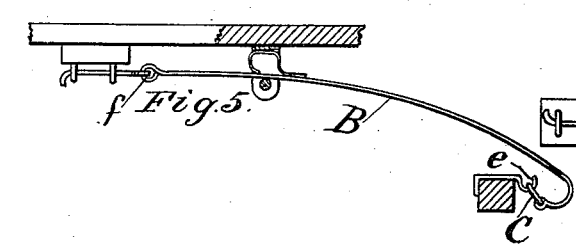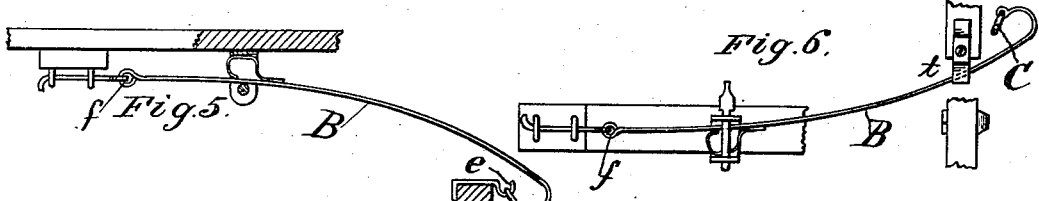
Witnesses
W. R. Edelin.
Pennington Halsted.
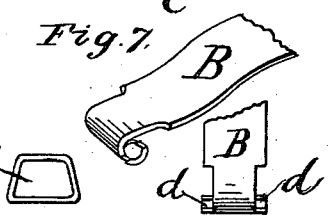
Inventor
A. W. McKown
per John J. Halsted,
Atty.

2 Sheets—Sheet 2.
A. W. McKOWN.
AUXILIARY WAGON-SPRING.
No. 192,383. Patented June 26, 1877.
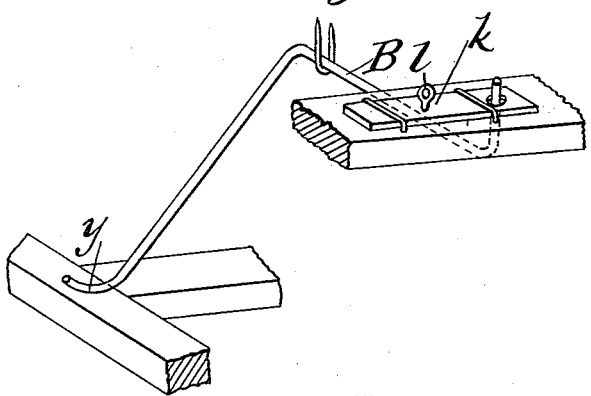
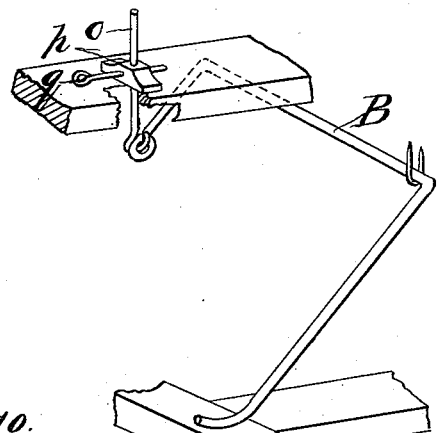
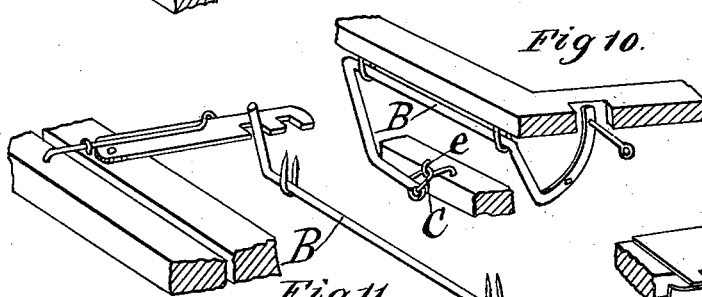
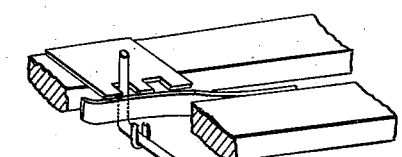
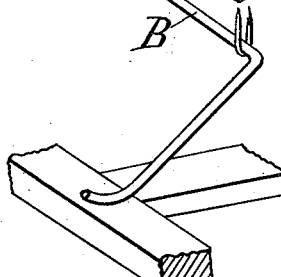
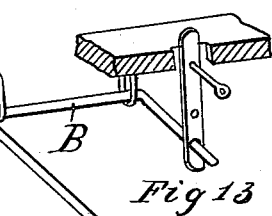
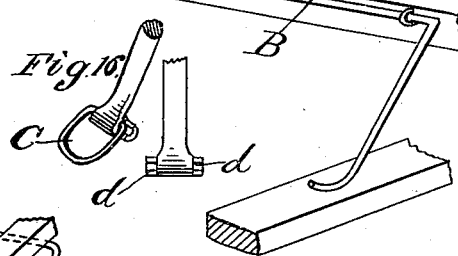
Witnesses
W. R. Edelen.
Oenw. Halsted
Inventor,
A. W. McKown
per John J. Halsted,
Atty.
N. PETERS, PHOTO-LITHOGRAPHER, WASHINGTON, D. C.

UNITED STATES PATENT OFFICE.

ALEXANDER W. McKOWN, OF KIMBLE, PENNSYLVANIA.

IMPROVEMENT IN AUXILIARY WAGON-SPRINGS.

Specification forming part of Letters Patent No. 192,383, dated June 26, 1877; application filed April 13, 1877.

*To all whom it may concern:*

Be it known that I, ALEXANDER W. Mc-KOWN, of Kimble, in the county of Pike and State of Pennsylvania, have invented certain new and useful Improvements in Auxiliary Wagon-Springs; and I do hereby declare that the following is a full, clear, and exact description thereof, which will enable others skilled in the art to which it appertains to make and use the same, reference being had to the accompanying drawing, and to the letters of reference marked thereon, which form a part of this specification.

My present invention relates to novel devices for connecting and disconnecting auxiliary springs used in vehicles to supplement at will the main springs; and it consists, primarily, in providing the link of the auxiliary spring with a means for arresting its dropping motion, so as to insure its assuming such a position relatively to the hook with which it is to connect that when the auxiliary spring is lowered for such connection or engagement it will, of itself, engage itself upon the hook and bring the spring into operative action. It further consists in devices for operating the auxiliary springs to put them into or out of action, by hinging the rear ends of such springs and employing a movable lifting and lowering device or lever, located between its ends, or by hinging or swinging it between its ends and raising and lowering it at its rear end. And it still further consists in such a construction and arrangement of auxiliary springs that two or more may be simultaneously raised or lowered into position for use by a single act and device, and in other details hereinafter stated, most of the springs described being adapted to be brought into or out of action, without requiring the driver to get out of the wagon for the purpose.

In the drawings, Figure 1 is a perspective of a wagon-frame, exhibiting the means for connecting and disconnecting the auxiliary springs, the remaining figures (except in Figs. 7 and 16) showing various devices for putting the auxiliary springs into or out of re-enforcing position; Fig. 7, enlarged views of that end of a flat spring to which the link is attached, and of the stops by which the link is held in proper position to engage itself upon a hook, and Fig. 16 the same on a torsional spring.

In the several figures, A indicates the main springs, which may be of any approved kind of spring, flat or torsional, bow-spring, or elliptical, and B the auxiliary springs. C C, &c., are the links attached to the extremity of the several auxiliary springs, which are intended to engage with hooks when lowered into action; but these links, instead of being hung loosely to the springs, as shown in my Patent No. 171,401, dated December 21, 1875, so that when disconnected from their respective hooks they would hang or drop down into a vertical position, are each so attached to the spring, and the latter is so made with projections or stops, or equivalent device, that the link may not drop below a somewhat horizontal position, at which position it is arrested and held by such stop or stops *d*.

The effect of this is that the link or loop, when the spring is lowered, may, of itself, engage and connect with the hook *e*, without any attention from the driver, and this permits the device by which the spring or lever end is lowered to be operated by a person sitting in the wagon; and the raising of the spring by the same device (whatever that may be) also as readily disconnects the link from its hook.

It will be evident that this improvement in the link-connection is applicable not only to flat auxiliary springs, but also to torsional ones, an illustration of one of which, with its attached link, being shown in Figs. 10, 11, and 16.

For the purpose of raising and lowering the auxiliary springs into and out of action, I have illustrated various kindred devices, and they may be grouped into two classes, viz.: those which lift or lower the spring at its inner end, the fulcrum of the spring being located between its ends, and those which lift or lower it between its ends, the fulcrum being at its inner end. The hinges or fulcra at the inner ends are shown at *f*, in Figs. 1, 3, 5; those between the ends are shown at *g*, in Figs. 2, 4.

The device for lifting and lowering, and locking to place in either position, may be of sundry kinds—as, for instance, an arm, *h*, arranged to be movable in a slot in the body of the wagon, and held to its desired position by entering one or the other of the holes $i$ in a spring-detainer, $j$, or held similarly to place by connection with a slide, $k$, which is held to its adjusted position by a pin, $l$, entering appropriate holes in the body, or by an arm of the lifting lever being held by a hook, or by a plug or bolt, $m$, passing through a bracket, $n$, on the spring to hold it down, or passing under the spring to hold it up, or by a lifting-rod, $o$, having nicks or notches in its side, and projecting through a hole in a plate or bracket, $p$, a pin, $q$, passing transversely through such bracket and engaging with one of such notches, or by a swinging or lever catch, $r$, whose edge may enter a notch in the lifting-rod, a pin, $s$, serving to hold such catch to place; or the spring may be so hung at its inner end as to be capable of being turned a quarter over, bringing the edge of the spring (if it be a flat one) upward, as seen at Fig. 6, so that it may rest upon any appropriate support, $t$.

The arrangement of two auxiliary springs, to be operated at the same time by one device, is shown at Fig. 4. Depending from the wagon-body is a bracket or pendant, $u$, through which passes a bar, $v$, having holes to receive a pin, $w$, the upper portion of this bar having an eye or loop, $x$, into which enter the inner or rear ends of both the springs B and B, each of which may be bent, as shown at $g$, to form a fulcrum-point, at which it may be hung upon a staple or fulcrum pin or bearing. The pin $w$ being withdrawn from a hole in the bar $v$, the springs may both be raised or lowered together by simply shifting the bar up or down, and the insertion of the pin through the appropriate hole in the bar will lock the springs as desired. This pin may be so shaped, or extend to such desired part of the wagon, as to be accessible to be operated from the most convenient place, as circumstances may require, as, indeed, may any other of the above-named devices for effecting the putting into or out of re-enforcing position any of the auxiliary springs employed in the vehicle.

These lifting and lowering devices are equally applicable to springs which have no connecting-link, but which come into action by causing their outermost or free end to bear or ride upon a beam or axle of the vehicle, as shown at $y$ in Figs. 4, 8, 9, 12, 13, 14, and 15.

With the flat or half side springs the sustaining power may be brought more central of the body of the vehicle. When it is desired to get this sustaining power as close as possible to the end of the box or body, the torsional springs are best for this purpose, or a coiled or any other form of spring having an end that can be raised or lowered by the devices, as described, for that purpose.

It will, of course, be understood that in the torsional springs the lever end which is raised and lowered gives the torsion or spring to that portion which is in bearings, and which thus becomes, by such raising and lowering of its lever end, the operative spring.

I claim—

1. The combination, with a wagon-spring having a link detaining or stopping device, of a link, substantially as and for the purpose set forth.

2. In combination with an auxiliary wagon-spring having a link detaining or stopping device, the link C, and a hook, $e$, on the bolster or axle, substantially as shown and described.

3. Auxiliary wagon-springs, fulcrumed at their rear ends or at a point between their ends, having lifting or lowering devices, substantially as described, adapted to throw or place the springs into or out of action.

4. A lifting or lowering device applied to the rear portions of two or more auxiliary springs, and adapted to place these springs by one act out of or into action.

ALEXANDER W. McKOWN.

Witnesses:
JOHN McINTOSH,
WM. F. WOOD.